(12) United States Patent
Singh et al.

(10) Patent No.: US 6,372,811 B2
(45) Date of Patent: Apr. 16, 2002

(54) FLAME RESISTANT RIGID POLYURETHANE FOAMS BLOWN WITH HYDROFLUOROCARBONS

(76) Inventors: Sachchida N. Singh, 7 Rittenhouse Sq., Sicklerville, NJ (US) 08081; Steve B. Burns, 1107 Belmont Ave., Westmont, NJ (US) 08108; Patricia A. Jones, 501 Blackbird Dr., Bear, DE (US) 19701

(*) Notice: Subject to any disclaimer, the term of this patent is extended or adjusted under 35 U.S.C. 154(b) by 0 days.

(21) Appl. No.: 09/122,132

(22) Filed: Jul. 24, 1998

Related U.S. Application Data

(60) Provisional application No. 60/053,701, filed on Jul. 25, 1997.

(51) Int. Cl.$^7$ .............................................. C08G 18/14
(52) U.S. Cl. ........................ 521/131; 521/168; 521/172; 521/173; 521/174
(58) Field of Search ................................ 521/131, 168, 521/172, 173, 174

(56) References Cited

U.S. PATENT DOCUMENTS

| | | | | |
|---|---|---|---|---|
| 4,039,487 A | * | 8/1977 | Kolakowski et al. | 521/129 |
| 4,439,549 A | * | 3/1984 | Brennan | 521/131 |
| 4,595,711 A | | 6/1986 | Wood | |
| 4,652,591 A | * | 3/1987 | Londrigan | 521/172 |
| 5,308,883 A | | 5/1994 | Londrigan | |
| 5,578,651 A | * | 11/1996 | Lamberts et al. | 521/107 |
| 5,578,652 A | * | 11/1996 | Blanpied et al. | 521/107 |
| 5,578,653 A | * | 11/1996 | Hendreich et al. | 521/114 |
| 5,837,742 A | * | 11/1998 | Fishback | 521/172 |
| 5,866,626 A | * | 2/1999 | Blanpied et al. | 521/131 |

FOREIGN PATENT DOCUMENTS

| | | |
|---|---|---|
| DE | 4201269 | 7/1993 |
| JP | 02 086631 | 3/1990 |
| WO | WO96/12758 | 5/1996 |
| WO | WO96/14354 | 5/1996 |

* cited by examiner

Primary Examiner—John M. Cooney, Jr.
(74) Attorney, Agent, or Firm—Kevin J. Boland

(57) ABSTRACT

Rigid polyurethane foams having improved flame resistance are disclosed. The foams are prepared from a composition containing (a) an isocyanate, (b) an isocyanate reactive composition containing an aromatic polyester polyol, (c) an organo phosphorus compound and (d) a $C_1$ to $C_4$ hydrofluorocarbon.

30 Claims, No Drawings

FLAME RESISTANT RIGID POLYURETHANE FOAMS BLOWN WITH HYDROFLUOROCARBONS

This appln claims benefit of Prov. No. 60/053,701 filed Jul. 25, 1997.

FIELD OF THE INVENTION

The present invention is directed to foams having improved flame resistance. In particular, the foams of the invention are closed celled rigid polyurethane or urethane-modified polyisocyanurate.

BACKGROUND OF THE INVENTION

A critical factor in the large scale commercial acceptance of rigid polyurethane foams in the building insulation industry has been their ability to provide a good balance of properties. Rigid polyurethane foams are known to provide outstanding thermal insulation, excellent fire performance and superior structural properties, all at reasonably low density. Such rigid foams are (in general) prepared by reacting the appropriate polyisocyanate and isocyanate-reactive compound in the presence of a blowing agent. Chlorofluorocarbon blowing agents (CFCs) such as CFC-11 ($CCl_3F$) and CFC-12 ($CCl_2F_2$) have been the most commercially important blowing agents primarily because of their good thermal insulating properties and low or non-flammability. Use of such blowing agents has been a key reason for the good balance of properties of rigid polyurethane foams. Recently, CFCs have been associated with the declining ozone concentration in the earth's atmosphere and their use has been severely restricted. Hydrochlorofluorocarbons, especially HCFC-141b ($CCl_2FCH_3$) and HCFC-22 ($CHClF_2$) have become the interim solution in many applications, once again due to their good thermal insulating properties and low or non-flammability. HCFCs still have an ozone depletion potential and their use is under constant scrutiny. The production and use of HCFC-141b is presently scheduled to end by the year 2003 in the USA.

Such environmental concerns have led to a need to develop reaction systems which utilize blowing agent(s) having a zero ozone depletion potential while retaining the good balance of properties for which rigid polyurethane foams are known. A class of materials which have been investigated as such blowing agents are hydrofluorocarbons (HFCs), for example: 1,1,1,3,3-pentafluoropropane (HFC-245fa); 1,1,1,3,3-pentafluorobutane (HFC-365mfc); 1,1,1,2-tetrafluoroethane (HFC-134a); 1,1-difluoroethane (HFC-152a). There are numerous patents and literature references on the use of HFC's as blowing agents for rigid polyurethane foam. The use of such materials is disclosed, e.g., in U.S. Pat. No. 5,496,866 (Bayer); U.S. Pat. No. 5,461,084 (Bayer); U.S. Pat. No. 4,997,706 (Dow); U.S. Pat. No. 5,430,071 (BASF); U.S. Pat. No. 5,444,101 (ICI). Although HFCs are environmentally more acceptable than CFCs and HCFCs, they are inferior in fire properties. The polyurethane foams prepared using the HFC blowing agent must have good fire properties while retaining the good thermal and structural properties, all at densities comparable to those possible with CFC and HCFC blowing agents. Fire properties are especially important for rigid polyurethane foams used in the building industry as they must meet strict fire resistance codes.

At present, hydrofluorocarbons and hydrocarbons are the two leading classes of materials that are being evaluated by the rigid foam industry as zero ozone depletion potential (ODP) blowing agents. Neither of these two materials has all the attributes of an "ideal" blowing agent. For example, the global warming potentials of HFCs are high (lower than CFCs but still high by some accounts) but the VOC content is low. Hydrocarbons have extremely low direct global warming potential but they are considered VOCs.

Thus, there still remains an unfulfilled need to develop reaction systems in which blowing agents have a zero ozone depletion potential, and which produce foams with good balance of properties for which rigid polyurethane foams are known.

SUMMARY OF THE INVENTION

Therefore, it is the object of the present invention to provide closed celled rigid polyurethane or urethane-modified polyisocyanurate foams which have, even when blown with hydrofluorocarbons, equivalent or improved fire resistance properties than CFC or HCFC blown foams.

It is another object of the present invention to provide closed celled rigid polyurethane or urethane-modified polyisocyanurate foams blown with hydrofluorocarbons which have good thermal insulation and structural properties along with the improved fire properties.

It has now been unexpectedly discovered that the use of over 40 weight % of aromatic polyester polyols of average functionality lower than 3.0 as the polyfunctional isocyanate-reactive composition, along with the use of organo-phosphorous compounds in the foam formulation improves the fire properties of polyurethane foam prepared in the presence of HFC blowing agents. Such HFC blown foams also have surprisingly good thermal insulation and structural properties along with the improved fire properties. The compositions of the present invention advantageously make it possible to obtain the balance of properties best suited to meet both the commercial and environmental demands of the present times.

It has now surprisingly been found that rigid polyurethane foam having a density between 1.2 to 4.2 lb/cu.ft. with excellent fire properties and good thermal and structural properties can be obtained by using the formulation (1) organic polyisocyanates,
(2) a blowing agent comprising
   (a) $C_1$–$C_4$ hydrofluorocarbons which are vaporizable under the foaming conditions as the physical blowing agent, and
   (b) water
(3) polyfunctional isocyanate-reactive compositions containing over 40 weight % of aromatic polyester polyols of average functionality lower than 3.0,
(4) organo-phosphorous compounds, and
(5) one or more other auxiliaries or additives conventional to formulations for the production of rigid polyurethane and urethane-modified polyisocyanurate foams. Such optional additives include, but are not limited to: crosslinking agents, foam-stablilising agents or surfactants, catalyst, infra-red opacifiers, cell-size reducing compounds, viscosity reducers, compatibility agents, mold release agent, fillers, pigments, and antioxidants, wherein the amount of said organo-phosphorous compound used is such that the amount of phosphorous is between about 0.01 to about 2.5% by weight, based on the total weight of the foam forming reaction mixture.

In summary, the surprising technical advantages of this invention are the discovery of rigid polyurethane foam formulations blown using hydrofluorocarbons (zero ODP) blowing agents which give foams whose fire performance in laboratory tests are equal or superior to those foams blown with CFCs or HCFCs; structural performance, such as compressive strength and long term dimensional stability, is comparable or better than foam blown with CFCs or HCFCs; and initial and long term insulation performance comparable to those foams blown with CFCs or HCFCs.

The foams of the present invention are suitable for use in continuous lamination boardstock foams for commercial roof and residential wall insulation, as well as metal-faced panels, spray foams, and fire-rated doors.

DETAILED DESCRIPTION OF THE INVENTION

Each of the above disclosed materials utilized in the foams of the present invention are described hereinafter.

(1) Isocyanate: Any organic polyisocyanates may be used in the practice of the invention. A preferred isocyanate is polyphenylene polymethylene polyisocyanate (PMDI). A most preferred isocyanate is those PMDI with diphenyl methane diisocyanate content of about 15 to about 42% by weight based on 100% by weight of the isocyanate.

The amount of isocyanate is typically about 30–75%, more preferably about 40–70% and most preferably about 45–65% by weight based on 100% of the total foam formulation.

(2a) HFC blowing agent: Any of the $C_1$–$C_4$ hydrofluorocarbons which are vaporizable under the foaming conditions can be used alone or as mixtures. Suitable HFCs include difluoromethane (HFC-32); trifluoromethane (HFC-23); 1,1-difluoroethane (HFC-152a); 1,1,1-trifluroethane (HFC-143a); 1,1,1,2-tetrafluoroethane (HFC-134a); pentafluoroethane (HFC-125); all isomers of pentafluoropropane (HFC-245 fa, ca, eb, ea etc.); all isomers of heptafluoropropane (HFC-236 ca, cb, ea, eb); isomers of pentaflurobutane (HFC-365); 1,1,1,4,4,4-hexafluorobutane (HFC-356mffm). Preferred HFCs include 1,1,1,3,3-pentafluoropropane (HFC-245fa); 1,1,1,3,3-pentaflurobutane (HFC-365mfc). Most preferred is HFC-245fa.

Other blowing agents, especially air, nitrogen, carbon dioxide, alkanes, alkenes, ethers may be used as the minor physical blowing agent. Representative alkanes include n-butane, n-pentane, isopentane, cyclopentane and mixtures thereof. Representative alkenes include 1-pentene. Representative ethers include dimethyl ether.

(2b) Water: Water reacts with isocyanate under foam forming conditions to liberate $CO_2$. Water could be used with any of the physical blowing agents specified in 2(a).

The blowing agents are employed in an amount sufficient to give the resultant foam the desired density between 1.2 to 4.2 lb/cu.ft, preferably 1.4 to 4.0 lb/cu. ft., and most preferably 1.6 to 3.8 lb/cu. ft. Additionally, the amount of HFC used is such that the gaseous mixture in the closed cell of the rigid foam when initially prepared is between about 99–20%, preferably about 97–30%, most preferably about 95–40% molar percent HFC.

(3) Polyfunctional isocyanate-reactive compositions: These typically contain over about 40 weight % of aromatic polyester polyols of average functionality less than 3, the remaining being other types of isocyanate-reactive compound.

Suitable aromatic polyester polyols include those prepared by reaction a polycarboxylic acid and/or a derivative thereof or an anhydride with a polyhydric alcohol, wherein at least one of these reactants is aromatic. The polycarboxylic acids may be any of the known aliphatic, cycloaliphatic, aromatic, and/or heterocyclic polycarboxylic acids and may be substituted, (e.g., with halogen atoms) and/or unsaturated. Examples of suitable polycarboxylic acids and anhydrides include oxalic acid, malonic acid, glutaric acid, pimelic acid, succinic acid, adipic acid, suberic acid, azelaic acid, sebacic acid, phthalic acid, isophthalic acid, terephthalic acid, trimellitic acid, trimellitic acid anhydride, pyromellitic dianhydride, phthalic acid anhydride, tetrahydrophthalic acid anhydride, hexahydrophthalic acid anhydride, endomethylene tetrahydrophthalic acid anhydride, glutaric acid anhydride acid, maleic acid, maleic acid anhydride, fumaric acid, and dimeric and trimeric fatty acids, such as those of oleic acid which may be in admixture with monomeric fatty acids. Simple esters of polycarboxylic acids may also be used such as terephthalic acid dimethylester, terephthalic acid bisglycol and extracts thereof.

Examples of suitable aromatic polycarboxylic acids are: phthalic acid, isophthalic acid, terephthalic acid, and trimellitic acid. Suitable aromatic polycarboxylic acid derivatives are: dimethyl or diethyl esters of polycarboxylic acids such as phthalic acid, isophthalic acid, terephthalic acid, and trimellitic acid. Examples of suitable aromatic anhydrides are phthalic anhydride, tetrahydrophthalic anhydride, and pyromellitic anhydride.

While the polyester polyols can be prepared from substantially pure reactant materials as listed above, more complex ingredients may be advantageously used, such as the side-streams, waste or scrap residues from the manufacture of phthalic acid, phthalic anhydride, terephthalic acid, dimethyl terephthalate, polyethylene terephthalate, and the like.

The polyhydric alcohols suitable for the preparation of polyester polyols may be aliphatic, cycloaliphatic, aromatic, and/or heterocyclic. The polyhydric alcohols optionally may include substituents which are inert in the reaction, for example, chlorine and bromine substituents, and/or may be unsaturated. Suitable amino alcohols, such as monoethanolamine, diethanolamine or the like may also be used. Examples of suitable polyhydric alcohols include ethylene glycol, propylene glycol, polyoxyalkylene glycols (such as diethylene glycol, polyethylene glycol, dipropylene glycol and polypropylene glycol), glycerol and trimethylolpropane. Examples of suitable aromatic polyhydric alcohols are 1,4, benzene diol, hydroquinone di (2-hydroxyethyl) ether, bis (hydroxyethyl) terephthalate, and resorcinol.

The polyester polyol utilized in the present invention is aromatic and has an average functionality of less than 3. Thus, either the polycarboxylic acid (and/or a derivative thereof or an anhydride component) or the polyhydric alcohol or both are aromatic and the average functionality of reaction product is less than 3.0. There are a number of such polyols commercially available. STEPANPOL® PS-2352, PS-2402, PS-3152 are some such polyols manufactured by the Stepan Company. TERATE® 2541, 254, 403, 203 are some such polyols, manufactured by Hoechst-Celanese Corporation,. TEROL® 235, 235N, 250 are some such polyols manufactured by Oxid, Inc.

The polyfunctional isocyanate-reactive compositions may contain up to 60% of other suitable isocyanate-reactive compounds. Examples of such compositions include polyether polyols, aliphatic polyester polyols and mixtures thereof, having equivalent weights from about 40 to about 4000 of preferably about 50 to about 3000 and average hydroxyl functionalities of about 2 to about 8 and preferably about 2 to about 6. Further examples of suitable polyfunctional isocyanate-reactive compositions include active hydrogen-terminated polythioethers, polyamides, polyester amides, polycarbonates, polyacetals, polyolefins and polysiloxanes. Additional useful isocyanate-reactive materials include primary and secondary diamines (Unilink 4200), enamines, cyclic ureas, cyclic carbonate, and polycarboxylic acid. Some of these compounds react with isocyanate to evolve carbon dioxide and contribute to foam blowing.

(4) Organo-phosphorous compounds: Various phosphorous-containing organic compounds can be used. Suitable compounds include phosphates, phosphites, phosphonates, polyphosphates, polyphosphites, polyphosphonates, ammonium polyphosphate. Suitable phosphate compounds are of the following formula:

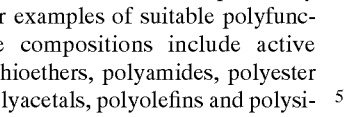

where $R^1$ to $R^3$ signifies alkyl, halogen substituted alkyl, aryl, halogen substituted aryl and cycloalkyl groups. Preferred phosphates are those where $R^1$ to $R^3$ signifies $C_1$–$C_{12}$ alkyl, $C_1$–$C_{12}$ halogen substituted alkyl, phenyl, cresyl, halogen substituted phenyl and $C_5$–$C_{10}$ cycloalkyl groups. More preferred phosphates are those where $R^1$ to $R^3$ signifies $C_1$–$C_8$ alkyl, $C_1$–$C_8$ halogen substituted alkyl, and phenyl groups. Most preferred phosphate compounds are those where $R^1$ to $R^3$ signifies $C_1$–$C_4$ alkyl, $C_1$–$C_4$ halogen substituted alkyl, and phenyl groups. Some specific compounds under most preferred phosphates are tributyl phosphate, tris(2-chloropropyl)-phosphate (Antiblaze 80 from Albright & Wilson), t-butylphenyl diphenylphosphate (Phosflex 71B from Akzo Nobel), triethyl phosphate (TEP from Eastman), tributyl phosphate (Phosflex 4 from Akzo Nobel), chloropropyl bis(bromopropyl) phosphate (Firemaster FM836 from Great Lakes).

Suitable phosphite compounds are of the following formula:

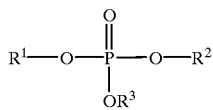

where $R^1$ to $R^3$ signifies H, alkyl, halogen substituted alkyl, aryl, halogen substituted aryl and cycloalkyl groups. Preferred phosphites are those where $R^1$ to $R^3$ signifies $C_1$–$C_{12}$ alkyl, $C_1$–$C_{12}$ halogen substituted alkyl, phenyl, cresyl, halogen substituted phenyl and $C_5$–$C_{10}$ cycloalkyl groups. More preferred phosphites are those where $R^1$ to $R^3$ signifies, $C_1$–$C_8$ alkyl, $C_1$–$C_8$ halogen substituted alkyl, and phenyl groups. Most preferred phosphite compounds are those where $R^1$ to $R^3$ signifies $C_1$–$C_4$ alkyl, $C_1$–$C_4$ halogen substituted alkyl, and phenyl groups. Some especially suitable phosphates are triethyl phosphite (Albrite TEP from Albright & Wilson), tris(2-chloroethyl)-phosphite, and triphenyl phosphite (Albrite TPP).

Suitable phosphonate compounds are of the following formula:

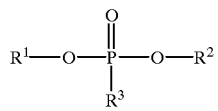

where $R^1$ to $R^3$ signifies alkyl, halogen substituted alkyl, aryl, halogen substituted aryl and cycloalkyl groups. Preferred phosphonates are those where $R^1$ to $R^3$ signifies $C_1$–$C_{12}$ alkyl, $C_1$–$C_{12}$ halogen substituted alkyl, phenyl, cresyl, halogen substituted phenyl and $C_5$–$C_{10}$ cycloalkyl groups. More preferred phosphonates are those where $R^1$ to $R^3$ signifies $C_1$–$C_8$ alkyl, $C_1$–$C_8$ halogen substituted alkyl, and phenyl groups. Most preferred phosphonate compounds are those where $R^1$ to $R^3$ signifies $C_1$–$C_4$ alkyl, $C_1$–$C_4$ halogen substituted alkyl, and phenyl groups. Some especially suitable phosphonates are diethyl ethyl phosphonate (Amgard V490 from Albright & Wilson), dimethyl methyl phosphanate (Amgard DMMP), bis(2-chloroethyl), and 2-chloroethyl phosphonate.

Illustrative examples of polyphosphate compound are Amgaurd V-6, a chlorinated diphosphate ester, from A&W. Illustrative examples of ammonium polyphosphate $[(NH_4PO_3)_n$; n=about 1000) is Hostaflam AP 422 from Hoechst AG.

The organo-phosphorous compounds used in the invention may have one or more isocyanate-reactive hydrogen comprising of hydroxyl group, amino group, thio group, or mixture thereof. Suitable compounds include monomeric or oligomeric phosphates, phosphites, and phosphonates polyols. Suitable isocyanate-reactive phosphate compounds are those prepared by (1) the reaction of polyalkylene oxides with (a) phosphoric acids (b) partial esters of phosphoric acids; (2) the reaction of aliphatic alcohols with (a) phosphoric acids (b) partial esters of phosphoric acids; and (3) by transesterification of products of (1) and (2). The preferred compounds include tributoxyethyl phosphate (Phosflex T-BEP from Akzo); oligomeric organophosphate diol (Hostaflam TP OP 550 from Hoechst AG); ethoxylated phosphate esters (Unithox X-5126 from Petrolite); and mono- and diesters of phosphoric acid and alcohols (Unithox X-1070 from Petrolite).

Suitable isocyanate-reactive phosphite compounds are those prepared by (1) the reaction of polyalkylene oxides with (a) phosphorous acids (b) partial esters of phosphorous acids; (2) the reaction of aliphatic alcohols with (a) phosphorous acids (b) partial esters of phosphorous acids; and (3) by transesterification of products of (1) and (2).

Suitable isocyanate-reactive phosphonate compounds are those prepared (1) by the reaction of polyalkylene oxides with phosphonic acids, (2) by the reaction of phosphite polyols with alkyl halides; (3) by the condensation of dialkyl phosphonates, diethanolamine and formaldehyde; (4) by transesterification of products of (1) (2) and (3); and (5) by reaction of dialkyl alkyl phosphonate with phosphorous pentaoxide and alkylene oxide. The preferred compounds include diethyl N,N-bis(2-hydroxyethyl) aminoethyl phosphonate (Fyrol 6 from Akzo); hydroxyl containing oligomeric phosphonate (Fyrol 51 from Akzo).

The amount of said organo-phosphorous compound used is such that the amount of phosphorous is between about 0.01 to about 2.5% by weight, based on the total weight of the foam forming reaction mixture. Preferred amount of phosphorous is between about 0.025 to about 1.5% and most preferred is about 0.05 to about 1.0% by weight, based on the total weight of the foam forming reaction mixture.

(5) Additives: The resin side can also contain various auxiliary agents and additives as needed for a particular purpose. Suitable auxiliaries and additives include crosslinking agents, such as triethanolamine and glycerol; foam stabilizing agents or surfactants, such as siloxane-oxyalkylene copolymers; oxyethylene-oxyalkylene copolymer; catalysts, such as tertiary amines, (e.g., dimethylcyclohexylamine, pentamethyldiethylenetriamine, 2,4,6-tris (dimethylaminomethyl) phenol, triethylenediamine); organometallic compounds (e.g., potassium octoate, potassium acetate, dibutyl tin dilaurate), quaternary ammonium salts (e.g., 2-hydroxypropyl trimethylammonium formate) and n-substituted triazines (N, N', N"-dimethylaminopropylhexahydrotriazine); viscosity reducers such as propylene carbonate, 1-methyl-2-pyrrolidinone; infra-red opacifiers such as carbon black, titanium dioxide, metal flakes; cell-size reducing compounds such as inert, insoluble fluorinated compounds, perfluorinated compounds; reinforcing agent such as glass fibers, ground up foam waste; mold release agents, such as zinc stearate; antioxidents, such as butylated hydroxy toluene; and pigments such as azo-/diazo dyestuff, phthalocyanines.

Amount of such additives are generally between about 0.1–20%, preferably between about 0.3–15% and most preferably between about 0.5–10%, by weight based on 100% of the total foam formulation.

In carrying out the process for making rigid foams according to this invention, the known one-shot, prepolymer or semi-prepolymer techniques may be used together with conventional mixing methods including impingement mixing. The rigid foam may be produced in the form of slabstock, mouldings, cavity filling, sprayed foam, frothed foam or laminates with other material such as paper, metal, plastics, or wood-board.

The various aspects of this invention are illustrated, but not limited by, the following examples. Unless otherwise noted, all temperatures are expressed in degrees Celsius and all formulation components are expressed in parts by weight.

EXAMPLES

Following materials are referred to in the examples.

STEPANPOL® PS-2352: An aromatic polyester polyol of hydroxyl value 240 mg KOH/g, average functionality of around 2 and viscosity of 3,000 cPs @ 25° C. from Stepan company. The aromatic polyester polyol content of this polyol is above 80% by weight.

VORANOL® 240–800: A polyether polyol of hydroxyl value 800 mg KOH/g, average functionality of 3 and viscosity of 3,500 centiStokes @ 100° F. from the Dow Chemical Company.

ALKAPOL® A-630: An aliphatic amine-based polyether polyol of hydroxyl value 630 mg KOH/g, average functionality of 3 and viscosity of from 450 cPs @ 25° C. the Dow Chemical Company.

RUBINOL® R159: An aromatic amine-based polyether polyol of hydroxyl value 500 mg KOH/g, average functionality of 3.2 and viscosity of from 18000 cPs @ 25° C. from ICI Americas Inc.

RUBINOL® R124: An aromatic amine-based polyether polyol of hydroxyl value 395 mg KOH/g, average functionality of 3.9 and viscosity of from 18000 cPs @ 25° C. from ICI Americas Inc.

TCPP: Tri(beta-chloropropyl)phosphate (% P=9.5) available from Akzo Nobel Chemical Inc.

TEP: Triethyl Phosphate (% P=17) available from Eastman Chemical Corporation.

PELRON® 9540A: Potassium octoate in diethylene glycol available from Pelron Corp.

PELRON® 9650: Potassium acetate in diethylene glycol available from Pelron Corp.

POLYCAT® 5: Pentamethyldiethylenetriamine available from Air Products.

DABCO® 33LV: Triethylenediamine in dipropylene glycol available from Air Products.

DABCO® 125: An organotin polyurethane catalyst available from Air Products.

TEGOSTAB® B84PI: A silicone surfactant available from Goldschmidt Corporation.

TEGOSTAB® B8404: A silicone surfactant available from Goldschmidt Corporation.

LK-221®: A non-silicone surfactant available from Air Products.

HCFC-141b: Dichlorofluoroethane blowing agent available from Elf-Atochem North America.

HFC-245fa (Pressurized): Available from AlliedSignal Chemicals.

RUBINATE® 1850: A high functionality polymeric MDI available from ICI Americas.

Example 1

A number of rigid polyurethane foams were prepared using the formulations shown in Table 1. All foams were made using the following general procedure.

Polyol blend was made by mixing together all the ingredients listed under "Polyol Side" except the HFC-245fa using a high speed mixer at room temperature. The polyol blend was added to the "Polyol Side" tank of a Edge-Sweets high pressure impingement mix dispense machine. An appropriate amount of HFC-245fa, based on the composition shown in Table 2, was added to the "Polyol Side" tank and mixed vigorously using an air-mixer attached to the tank. Isocyanate was added to the "Iso side" tank attached to the dispense machine. The machine parameters were set as follows:

| Machine Parameters | Foam # 1, 2 & 3 | Foam #4 |
| --- | --- | --- |
| "Iso Side" temperature, ° F. | 70 | 80 |
| "Polyol Side" temperature, ° F. | 60 | 70 |
| Mix pressure, psig | 2,000 | 2,000 |
| "Iso Side" Pump RPM | 70 | 70 |
| "Polyol Side" Pump RPM | Adjusted to give the Polyol to Iso side weight ratio shown in Table 1 | Adjusted to give the Polyol to Iso side weight ratio shown in Table 1 |
| Dispense rate, gms/second | 200 | 200 |

The foaming ingredients were shot from the dispense machine into a 5-liter cup and reactivity and density were measured on this free-rise foam. The foam core density was measured following ASTM D 1622. Fire performance was tested on foam specimens taken from 4"×15"×15" foam blocks according to the Butler Chimney Test, ASTM D 3014. This test measures the weight retention and flame extinguishing time of foam specimen. Fire performance was also measured by the Hot Plate Test on core specimens taken from 7"×7"×15" foams made by dispensing foaming ingredients into a cardboard box. The Hot Plate test is described in *"Flammability Study of Hydrocarbon-Blown Isocyanu-* rate Foams," *Proceedings of the 35th Annual SPI Polyurethane Technical/Marketing Conference*, Page 561 (1994). The maximum smoke density under flaming conditions in NBS Smoke Test was measured according to ASTM E662.

The structural properties were measured on core specimens taken from 7"×7"×15" foams made by dispensing foaming ingredients into a cardboard box. The low temperature dimensional stability was measured after 7 days of exposure at −25° C. following the "Dimvac method" described in *"Techniques to Assess the Various Factors Affecting the Long Term Dimensional Stability of Rigid Polyurethane Foam,"* Proceedings of the Polyurethane 1995 Conference, Page 11 (1995). The compressive strength was measured parallel and perpendicular to the foam rise direction, following ASTM D 1621, Procedure A. Thermal properties of the foams were measured according to the procedures set forth in ASTM C 518 on core foam taken from 4"×15"×15" foam blocks. Foams #1 and #2 represent the foams prepared using the formulations according to this invention. Foam #3 and #4 represent the comparative foams. Foams #1, #2 and #3 were blown using a zero ODP blowing agent HFC-245fa. The formulation used to make Foam #4 represents the present state of art and is blown using a ozone depleting blowing agent HCFC-141b.

In Butler Chimney Test, a higher weight retention, lower flame height and lower flame extinguish time indicate a superior fire resistance. As we can see from Table 1, the fire resistance performances (as measured by Butler Chimney test) of Foam #1 and Foam #2 are much better than Foam #3, and equivalent to or better than Foam #4. In the Hot Plate Test, a higher weight retention and a higher thickness retention imply superior fire resistance. The fire resistance properties (as measured by Hot Plate Test) of Foam #1 and Foam #2 are much better than Foam #3 and equivalent to or better than Foam #4. In the NBS smoke test, the lower the maximum smoke density, the better the fire resistance of the foam. Once again, Foam #1 and Foam #2 gave much better fire resistance results than Foam #3 and Foam #4. Thus in all of the laboratory fire tests, Foam #1 and Foam #2 gave a much better fire resistance performance than Foam #3 and equivalent to or better than Foam #4. Though Foams #1, #2 and #3 are blown using a HFC and use >50% aromatic polyester polyol, only Foams #1 and #2 contain the organo-phosphorous compound disclosed in this invention. Foam #4 which represents the present state of art, also does not use the organo-phosphorous compound and is blown using a HCFC blowing agent, HCFC-141b.

In a dimensional stability test, the closer the % linear change is to zero, the better the dimensional performance of foam. Foams #1 and Foam #2 gave better dimensional stability as compared to Foam #3 and Foam #4. In the compressive strength measurements, the higher the number the better the structural performance of the foam. Here too, Foams #1 and Foam #2 gave better performance than Foam #3 and Foam #4.

In thermal property evaluations, the lower the k-factor, the better the insulation performance of the foam. In Table 1, we see that the initial k-factor of Foams #1, #2 and #3 are the same, though slightly higher than that for #4. The aged k-factor of the inventive Foam #1 & #2 is lower and thus better than the present state of art, Foam #4.

Example 2

For comparison, a rigid polyurethane foam #5, was prepared using the formulation shown in Table 2. Foam #5 was made using an organic polyisocyanate, a hydrofluorocarbon (HFC-245fa) as blowing agent, polyether polyols as polyfunctional isocyanate-reactive composition, an organo-phosphorous compound and other additives. Foam #5 did not use an aromatic polyester polyol as polyfunctional isocyanate-reactive composition and thus is a comparative foam.

As can be seen from Table 2, the fire resistance performance (as measured by Butler Chimney test, Hot Plate Test and the NBS smoke test) of Foam #5 was much worse than Foam #1 and #2. The fire resistance properties of Foam #5 were similar to Foam #3 and poor. Though Foams #1, #2 and #5 were blown using a HFC and contained the organo-phosphorous compound, only Foams #1 and #2 used aromatic polyester polyols as disclosed in this invention. This suggested that both the organo-phosphorous compound and aromatic polyester polyol were required to get the good fire resistance when using a HFC blowing agent.

The structural properties of Foam #5 were similar to Foams #1 and #4, and were acceptable. Both the initial and the aged k-factor of Foam #5 were not as good as the inventive Foam #1 and #2. The aged k-factor of Foam #5 was similar to the present state of art, Foam #4.

The results clearly demonstrated that when blown with an environmentally acceptable HFC blowing agent, the foams (#1 and #2) made using the formulations of the invention gave superior fire resistance performance and equivalent or superior structural and thermal insulation performance, as compared with foams (#3 & #5) made using formulations outside of this invention. The formulations of the present invention made it possible to produce foams whose flame retardancy, structural, and thermal insulation performance were equivalent to or better than those made using current HCFC blowing agent.

The present invention has been described in considerable detail above. It will be understood that modifications routinely made by one of ordinary skill in the art are to be considered within the scope of the present invention.

TABLE 1

| Foam Samples | Foam #1 | Foam #2 | Foam #3 | Foam #4 |
|---|---|---|---|---|
| "Polyol Side" | | | | |
| Stepanpol PS-2352 | 100 | 100 | 100 | 100 |
| TCPP | 7.5 | | | |
| TEP | | 7.5 | | |
| Tegostab B84PI | | | | 2 |
| Tegostab B8404 | 1.5 | 1.5 | 1.5 | |
| Pelron 9540A | 2.2 | 2.2 | 2.2 | 1.75 |
| Pelron 9650 | 0.7 | 0.7 | 0.7 | 0.6 |
| Polycat 5 | 0.5 | 0.5 | 0.5 | 0.5 |
| Water | 0.5 | 0.5 | 0.5 | 0.5 |
| HCFC-141b | | | | 31 |
| HFC-245fa | 40.2 | 40.2 | 39 | |
| "Iso Side" | | | | |
| Rubinate 1850 | 177.6 | 177.6 | 177.6 | 180 |
| % Phosphorous in foam formulation | 0.22 | 0.42 | 0 | 0 |
| Aromatic polyol as a weight % of isocyanate-reactive composition | 80+ | 80+ | 80+ | 80+ |
| Reactivities: | | | | |
| Cream Time, seconds | 4 | 3 | 4 | 9 |
| Gel Time, seconds | 20 | 17 | 21 | 18 |
| Tack-Free Time, seconds | 25 | 21 | 30 | 23 |

TABLE 1-continued

| Foam Samples | Foam #1 | Foam #2 | Foam #3 | Foam #4 |
|---|---|---|---|---|
| Foam Properties: | | | | |
| Free rise density, pcf | 2.0 | 2.0 | 1.9 | 1.9 |
| Fire Performance | | | | |
| Butler Chimney Test | | | | |
| % Weight retained | 90 | 97 | 36 | 94 |
| Maximum flame height, cm | 24 | 16 | 25+ | 25+ |
| Flame extinguish time, seconds | 18 | 11 | 37 | 11 |
| Hot Plate Test | | | | |
| % Weight retained | 73 | 71 | 44 | 71 |
| % Thickness retained | 97 | 90 | 12 | 91 |
| Maximum Smoke Density | 84 | 67 | 104 | 108 |
| Structural Properties: | | | | |
| Dimensional stability, % linear change 7 days at −25° C., | −0.1 | −0.1 | −0.3 | −0.3 |
| Compressive Strength, psi | | | | |
| Parallel to rise | 61 | 50 | 49 | 52 |
| Perpendicular to rise | 21 | 17 | 14 | 15 |
| Thermal Properties: k-factor in BTU.in/ft$^2$.hr.° F. | | | | |
| Initial | 0.133 | 0.133 | 0.133 | 0.128 |
| After 3 months at room temperature | 0.151 | 0.154 | 0.155 | 0.162 |

TABLE 2

| Foam Samples | Foam #5 |
|---|---|
| "Polyol Side" | |
| Voranol 240-800 | 28.6 |
| Alkapol A-630 | 19.0 |
| Rubinol R159 | 44.1 |
| Rubinol R124 | 8.3 |
| TCPP | 8.3 |
| LK-221 | 1.4 |
| Dabco 33LV | 0.7 |
| Dabco 125 | 0.7 |
| HFC-245fa | 26.7 |
| "Iso Side" | |
| Rubinate M | 151.4 |
| % Phosphorous in foam formulation | 0.27 |
| Aromatic polyol as a weight % of isocyanate-reactive composition | 0 |
| Foam Properties: | |
| Foam density, pcf | 2.6 |
| Fire Performance | |
| Butler Chimney Test | |
| % Weight retained | 14.4 |
| Maximum flame height, cm | 25+ |
| Flame extinguish time, seconds | 42 |
| Hot Plate Test | |
| % Weight retained | 0 |
| % Thickness retained | 0 |
| Maximum Smoke Density | 506 |
| Structural Properties: | |
| Dimensional stability, 7 days at −25° C., % linear change | −1 |
| Compressive Strength, Parallel to rise, psi | 50 |
| Compressive Strength, Perpendicular to rise, psi | 29 |
| Thermal Properties: k-factor in BTU.in/ft$^2$.hr.° F. | |
| Initial | 0.142 |
| After 3 months at room temperature | 0.160 |

What is claimed is:

1. A foam forming composition comprising:
   a) an organic isocyanate,
   b) an isocyanate reactive composition containing at least 40% by weight based on the total weight of the isocyanate reactive composition of an aromatic polyester polyol having an average functionality of less than 3,
   c) a $C_1$ to $C_4$ hydrofluorocarbon blowing agent, and
   d) an organic phosphorus compound.

2. A foam forming composition, as claimed in claim 1 wherein the organic isocyanate is polyphenylene polymethylene polyisocyanate.

3. A foam forming composition as claimed in claim 2 wherein the isocyanate contains diphenyl methane diisocyanate in an amount equal to from about 15% to about 42% by weight based on the total weight of the isocyanate.

4. A foam forming composition as claimed in claim 1 wherein the amount of isocyanate is equal to from about 30% to about 75% by weight based on the total weight of the foam forming composition.

5. A foam forming composition as claimed in claim 1 wherein the aromatic polyester polyol in the isocyanate reactive composition is prepared by reaction of an aromatic polycarboxylic acid and a polyhydric alcohol.

6. A foam forming composition as claimed in claim 1 wherein the isocyanate reactive composition also contains a compound selected from the group consisting of polyether polyols, aliphatic polyester polyols, hydrogen-terminated polythioesters, polyamides, polyester amides, polycarbonates, polyacetals, polyolefins and polysiloxanes.

7. A foam forming composition as claimed in claim 1 wherein the $C_1$ to $C_4$ hydrofluorocarbon blowing agent is selected from the group consisting of difluoromethane, trifluoromethane, 1,1-difluoroethane, 1,1,1-trifluroethane, 1,1,1,2-tetrafluoroethane, pentafluoroethane, any isomer of pentafluoropropane, any isomer of heptafluoropropane, any isomer of pentafluorobutane, 1,1,1,4,4,4-hexafluorobutane, 1,1,1,3,3-pentafluoropropane and 1,1,1,3,3-pentaflurobutane.

8. A foam forming composition as claimed in claim 7 wherein the hydrofluorocarbon blowing agent is 1,1,1,3,3-pentafluoropropane.

9. A foam forming composition as claimed in claim 1 wherein the composition contains water as an additional blowing agent.

10. A foam forming composition as claimed in claim 1 wherein the organophosphorus compound is selected from the group consisting of phosphates, phosphites, phosphonates, polyphosphates, polyphosphites, polyphosphonates, and ammonium polyphosphate.

11. A foam forming composition as claimed in claim 1 wherein the organophosphorus compound is a phosphate compound having the following formula:

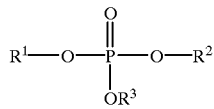

where $R^1$, $R^2$ and $R^3$ are independently selected from alkyl, halogen substituted alkyl, aryl, halogen substituted aryl and cycloalkyl groups.

12. A foam forming composition as claimed in claim 11 wherein $R^1$, $R^2$ and $R^3$ are independently selected from $C_1$–$C_{12}$ alkyl, $C_1$–$C_{12}$ halogen substituted alkyl, phenyl, cresyl, halogen substituted phenyl and $C_5$–$C_{10}$ cycloalkyl groups.

13. A foam forming composition as claimed in claim 11 wherein $R^1$, $R^2$ and $R^3$ are $C_1$ to $C_8$ alkyl or $C_1$ to $C_8$ halogen substituted alkyl.

14. A foam forming composition as claimed in claim 11 wherein $R^1$, $R^2$ and $R^3$ are $C_1$ to $C_4$ alkyl or $C_1$ to $C_4$ halogen substituted alkyl.

15. A foam forming composition as claimed in claim 11 wherein $R^1$, $R^2$ and $R^3$ are phenyl.

16. A foam forming composition as claimed in claim 1 wherein the organophosphorus compound is a phosphite compound having the following formula:

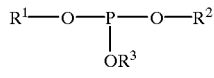

where $R^1$, $R^2$ and $R^3$ are independently selected from H, alkyl, halogen substituted alkyl, aryl, halogen substituted aryl and cycloalkyl groups.

17. A foam forming composition as claimed in claim 16 wherein $R^1$, $R^2$ and $R^3$ are independently selected from $C_1$–$C_{12}$ alkyl, $C_1$–$C_{12}$ halogen substituted alkyl, phenyl, cresyl, halogen substituted phenyl and $C_5$–$C_{10}$ cycloalkyl groups.

18. A foam forming composition as claimed in claim 16 wherein $R^1$, $R^2$ and $R^3$ are independently selected from $C_1$–$C_8$ alkyl or $C_1$–$C_8$ halogen substituted alkyl.

19. A foam forming composition as claimed in claim 16 wherein $R^1$, $R^2$ and $R^3$ are independently selected from $C_1$–$C_4$ halogen substituted alkyl.

20. A foam forming composition as claimed in claim 16 wherein $R^1$, $R^2$ and $R^3$ are phenyl.

21. A foam forming composition as claimed in claim 1 wherein the organophosphorus compound is a phosphonate compound having the following formula:

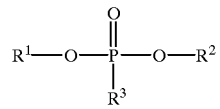

where $R^1$, $R^2$ and $R^3$ are independently selected from alkyl, aryl, halogen substituted alkyl, aryl, halogen substituted aryl and cycloalkyl groups.

22. A foam forming composition as claimed is claim 21 wherein $R^1$, $R^2$ and $R^3$ are independently selected from $C_1$–$C_{12}$ alkyl, $C_1$–$C_{12}$ halogen substituted alkyl, phenyl, cresyl, halogen substituted phenyl and $C_5$–$C_{10}$ cycloalkyl groups.

23. A foam forming composition as claimed in claim 21 wherein $R^1$, $R^2$ and $R^3$ are independently selected from $C_1$–$C_8$ alkyl or $C_1$–$C_8$ halogen substituted alkyl.

24. A foaming forming composition as claimed in claim 21 wherein $R^1$, $R^2$ and $R^3$ are independently selected from $C_1$–$C_4$ alkyl or $C_1$–$C_4$ halogen substituted alkyl.

25. A foam forming composition as claimed in claim 21 wherein $R^1$, $R^2$ and $R^3$ are phenyl.

26. A foam forming composition as claimed in claim 1 wherein the organophosphorus compound contains at least one isocyanate reactive hydrogen group selected from hydroxyl, amino and thio.

27. A foam forming composition as claimed in claim 1 wherein the amount of organophospohorus compound used is such that the amount of phosphorous in the composition is equal to from about 0.01 to about 2.5% by weight, based on the total weight of the composition.

28. A foam forming composition as claimed in claim 27 wherein the amount of organophosphorous compound used is such that the amount of phosphorous in the composition is from about 0.025 to about 1.5% by weight, based on the total weight of the composition.

29. A foam forming composition as claimed in claim 27 wherein the amount of organophosphorous compound used is such that the amount of phosphorous in the composition is from about 0.05 to about 1.0% by weight, based on the total weight of the composition.

30. A rigid polyurethane foam having a density of from 1.2 to 4.2 lb/cu ft prepared from the composition of claim 1.

* * * * *